(12) United States Patent
Zhang et al.

(10) Patent No.: US 9,676,308 B2
(45) Date of Patent: Jun. 13, 2017

(54) HEATING DEVICE

(75) Inventors: Jonathan Yu Zhang, Tianjin (CN); Yand Yanbing Zhang, Hebei Province (CN); Beck Hailong Liang, Hebei Province (CN); Fred Fufei Zhang, Hebei Province (CN)

(73) Assignee: GENTHERM GMBH, Odelzhausen (DE)

( * ) Notice: Subject to any disclaimer, the term of this patent is extended or adjusted under 35 U.S.C. 154(b) by 927 days.

(21) Appl. No.: 13/585,099

(22) Filed: Aug. 14, 2012

(65) Prior Publication Data
US 2013/0043320 A1    Feb. 21, 2013

(30) Foreign Application Priority Data

Aug. 19, 2011  (DE) .......... 10 2011 110 679
Dec. 23, 2011  (DE) .......... 10 2011 122 129
May 9, 2012    (DE) .......... 10 2012 009 066

(51) Int. Cl.
*B60H 1/00*    (2006.01)
*B60N 2/56*    (2006.01)

(52) U.S. Cl.
CPC ....... *B60N 2/5657* (2013.01); *B60H 1/00564* (2013.01); *B60N 2/5621* (2013.01); *B60N 2/5671* (2013.01); *B60N 2/5685* (2013.01)

(58) Field of Classification Search
USPC .......................................... 454/69
See application file for complete search history.

(56) References Cited

U.S. PATENT DOCUMENTS

| 1,276,150 | A | * | 8/1918 | Wirt ............... 219/212 |
| 1,370,832 | A |   | 3/1921 | Mollberg |
| 1,439,681 | A |   | 12/1922 | Alkire et al. |
| 1,464,280 | A | * | 8/1923 | Hynes ........... F24H 3/002 |
|           |   |   |        | 219/202 |
| 1,514,329 | A |   | 11/1924 | Metcalf |
| 2,022,959 | A |   | 12/1935 | Gordon |
| 2,158,801 | A |   | 5/1939 | Petterson |
| 2,703,134 | A |   | 3/1955 | Mossor |

(Continued)

FOREIGN PATENT DOCUMENTS

| DE | 37 05 756 | 10/1988 |
| DE | 10144839  | 3/2003 |

(Continued)

OTHER PUBLICATIONS

Excerpt from website http://www.seatcomfort.com/ventilation.htm, Specializing in Seat Heating Ventilation and Heating Systems, Ventilation.

(Continued)

*Primary Examiner* — Gregory Huson
*Assistant Examiner* — Martha Becton
(74) *Attorney, Agent, or Firm* — The Dobrusin Law Firm, P.C.

(57) ABSTRACT

A ventilating device is provided that includes at least one air guidance device and a heater resistor and/or a heat conducting pipe. The at least one air guidance device has at least one channel segment that is swingable relative to at least one additional channel segment. At least one of the channel segments carries the heater resistor and/or the heat conducting pipe to control a temperature of air streaming through the at least one air guidance device.

15 Claims, 2 Drawing Sheets

(56) References Cited

U.S. PATENT DOCUMENTS

| | | |
|---|---|---|
| 2,758,532 A | 8/1956 | Awe |
| 2,782,834 A | 2/1957 | Vigo |
| 2,791,956 A | 5/1957 | Guest |
| 2,826,135 A | 3/1958 | Benzick |
| 2,992,604 A | 7/1961 | Trotman et al. |
| 2,992,605 A | 7/1961 | Trotman et al. |
| 3,030,145 A | 4/1962 | Kottemann |
| 3,101,037 A | 8/1963 | Taylor |
| 3,101,660 A | 8/1963 | Taylor |
| 3,111,571 A * | 11/1963 | De Camp ............... F24D 5/02 219/494 |
| 3,119,918 A * | 1/1964 | Simon ................. H05B 3/00 174/138 J |
| 3,127,931 A | 4/1964 | Johnson |
| 3,131,967 A | 5/1964 | Spaulding |
| 3,162,489 A | 12/1964 | Trotman |
| 3,176,117 A * | 3/1965 | Knoll ................ F24H 3/0411 165/121 |
| 3,209,380 A | 10/1965 | Watsky |
| 3,440,400 A * | 4/1969 | Cotts ................ F24H 3/0405 165/74 |
| 3,486,177 A | 12/1969 | Marshack |
| 3,529,310 A | 9/1970 | Olmo |
| 3,550,523 A | 12/1970 | Segal |
| 3,653,590 A | 4/1972 | Elsea |
| 3,681,797 A | 8/1972 | Messner |
| 3,684,170 A | 8/1972 | Roof |
| 3,736,403 A | 5/1973 | Radke |
| 3,738,702 A | 6/1973 | Jacobs |
| 3,757,366 A | 9/1973 | Sacher |
| 3,770,318 A | 11/1973 | Fenton |
| 3,778,851 A | 12/1973 | Howorth |
| 3,794,810 A * | 2/1974 | Brasch ................ H05B 3/06 219/532 |
| 3,948,246 A | 4/1976 | Jenkins |
| 4,002,108 A | 1/1977 | Drori |
| 4,041,275 A * | 8/1977 | Gerdes ................. H05B 3/82 219/521 |
| 4,043,544 A | 8/1977 | Ismer |
| 4,060,276 A | 11/1977 | Lindsay |
| 4,072,344 A | 2/1978 | Li |
| 4,141,585 A | 2/1979 | Blackman |
| 4,259,896 A | 4/1981 | Hayashi et al. |
| 4,413,857 A | 11/1983 | Hayashi |
| 4,509,792 A | 4/1985 | Wang |
| 4,572,430 A | 2/1986 | Takagi et al. |
| 4,589,656 A | 5/1986 | Baldwin |
| 4,603,247 A * | 7/1986 | Foley ................ F24H 3/0405 138/103 |
| 4,685,727 A | 8/1987 | Cremer et al. |
| 4,712,832 A | 12/1987 | Antolini et al. |
| 4,729,598 A | 3/1988 | Hess |
| 4,777,802 A | 10/1988 | Feher |
| 4,847,933 A | 7/1989 | Bedford |
| 4,853,992 A | 8/1989 | Yu |
| 4,866,800 A | 9/1989 | Bedford |
| 4,905,475 A | 3/1990 | Tuomi |
| 4,923,248 A | 5/1990 | Feher |
| 4,946,220 A | 8/1990 | Wyon et al. |
| 4,981,324 A | 1/1991 | Law |
| 4,997,230 A | 3/1991 | Spitalnick |
| 5,002,336 A | 3/1991 | Feher |
| 5,004,294 A | 4/1991 | Lin |
| 5,016,302 A | 5/1991 | Yu |
| 5,054,540 A * | 10/1991 | Carr ................. B60H 1/3201 165/10 |
| 5,102,189 A | 4/1992 | Saito et al. |
| 5,106,161 A | 4/1992 | Meiller |
| 5,117,638 A | 6/1992 | Feher |
| 5,138,851 A | 8/1992 | Mardikian |
| 5,160,517 A | 11/1992 | Hicks et al. |
| 5,211,697 A | 5/1993 | Kienlein et al. |
| 5,221,916 A * | 6/1993 | McQueen ............ G01F 1/002 219/544 |
| 5,226,188 A | 7/1993 | Liou |
| 5,292,577 A | 3/1994 | Van Kerrebrouck et al. |
| 5,354,117 A | 10/1994 | Danielson et al. |
| 5,370,439 A | 12/1994 | Lowe et al. |
| 5,372,402 A | 12/1994 | Kuo |
| 5,382,075 A | 1/1995 | Shih |
| 5,385,382 A | 1/1995 | Single, II et al. |
| 5,403,065 A | 4/1995 | Callerio |
| 5,408,711 A | 4/1995 | McClelland |
| 5,411,318 A | 5/1995 | Law |
| 5,416,935 A | 5/1995 | Nieh |
| 5,450,894 A | 9/1995 | Inoue et al. |
| 5,561,875 A | 10/1996 | Graebe |
| 5,590,428 A | 1/1997 | Roter |
| 5,597,200 A | 1/1997 | Gregory et al. |
| 5,613,729 A | 3/1997 | Summer, Jr. |
| 5,613,730 A | 3/1997 | Buie et al. |
| 5,626,021 A | 5/1997 | Karunasiri et al. |
| 5,626,386 A | 5/1997 | Lush |
| 5,626,387 A | 5/1997 | Yeh |
| 5,640,951 A * | 6/1997 | Huddart ............. A61M 16/08 128/203.26 |
| 5,645,314 A | 7/1997 | Liou |
| 5,692,952 A | 12/1997 | Chih-Hung |
| 5,701,621 A | 12/1997 | Landi et al. |
| 5,715,695 A | 2/1998 | Lord |
| 5,787,534 A | 8/1998 | Hargest et al. |
| 5,833,309 A | 11/1998 | Schmitz |
| 5,833,321 A | 11/1998 | Kim et al. |
| 5,887,304 A | 3/1999 | Von der Heyde |
| 5,902,014 A | 5/1999 | Dinkel et al. |
| 5,918,930 A | 7/1999 | Kawai et al. |
| 5,921,100 A | 7/1999 | Yoshinori et al. |
| 5,921,314 A | 7/1999 | Schuller et al. |
| 5,921,858 A | 7/1999 | Kawai et al. |
| 5,924,766 A | 7/1999 | Esaki et al. |
| 5,924,767 A | 7/1999 | Pietryga |
| 5,927,817 A | 7/1999 | Ekman et al. |
| 5,934,748 A | 8/1999 | Faust et al. |
| 6,003,950 A | 12/1999 | Larsson |
| 6,019,420 A | 2/2000 | Faust et al. |
| 6,048,024 A | 4/2000 | Wallman |
| 6,059,016 A * | 5/2000 | Rafalovich ........ B60H 1/00492 165/10 |
| 6,059,018 A | 5/2000 | Yoshinori et al. |
| 6,062,641 A | 5/2000 | Suzuki et al. |
| 6,064,037 A | 5/2000 | Weiss et al. |
| 6,068,332 A | 5/2000 | Faust et al. |
| 6,079,485 A | 6/2000 | Esaki et al. |
| 6,085,369 A | 7/2000 | Feher |
| 6,105,667 A | 8/2000 | Yoshinori et al. |
| 6,109,688 A | 8/2000 | Wurz et al. |
| 6,145,925 A | 11/2000 | Eksin et al. |
| 6,147,332 A * | 11/2000 | Holmberg ............. A47C 7/748 219/217 |
| 6,164,719 A | 12/2000 | Rauh |
| 6,179,706 B1 | 1/2001 | Yoshinori et al. |
| 6,186,592 B1 | 2/2001 | Orizaris et al. |
| 6,189,966 B1 | 2/2001 | Faust et al. |
| 6,196,627 B1 | 3/2001 | Faust et al. |
| 6,224,150 B1 | 5/2001 | Eksin et al. |
| 6,263,530 B1 | 7/2001 | Feher |
| 6,273,810 B1 | 8/2001 | Rhodes et al. |
| 6,277,023 B1 | 8/2001 | Schwarz |
| 6,291,803 B1 | 9/2001 | Fourrey |
| 6,478,369 B1 | 11/2002 | Aoki et al. |
| 6,481,801 B1 | 11/2002 | Schmale |
| 6,491,578 B2 | 12/2002 | Yoshinori et al. |
| 6,497,275 B1 | 12/2002 | Elliot |
| 6,505,886 B2 | 1/2003 | Gielda et al. |
| 6,511,125 B1 | 1/2003 | Gendron |
| 6,541,737 B1 | 4/2003 | Eksin et al. |
| 6,578,910 B2 | 6/2003 | Andersson et al. |
| 6,592,181 B2 | 7/2003 | Stiller et al. |
| 6,598,405 B2 | 7/2003 | Bell |
| 6,604,785 B2 | 8/2003 | Bargheer et al. |
| 6,619,736 B2 | 9/2003 | Stowe et al. |
| 6,626,488 B2 | 9/2003 | Pfahler |
| 6,629,724 B2 | 10/2003 | Ekern et al. |

(56) References Cited

U.S. PATENT DOCUMENTS

| | | | |
|---|---|---|---|
| 6,629,725 B1 | 10/2003 | Kunkel et al. | |
| 6,676,207 B2 | 1/2004 | Rauh et al. | |
| 6,682,140 B2 | 1/2004 | Minuth et al. | |
| 6,685,553 B2 | 2/2004 | Aoki | |
| 6,687,937 B2 | 2/2004 | Harker | |
| 6,719,534 B2 | 4/2004 | Aoki et al. | |
| 6,719,624 B2 | 4/2004 | Hayashi et al. | |
| 6,722,148 B2 | 4/2004 | Aoki et al. | |
| 6,761,399 B2 | 7/2004 | Bargheer et al. | |
| 6,767,621 B2 | 7/2004 | Flick et al. | |
| 6,786,541 B2 | 9/2004 | Haupt et al. | |
| 6,786,545 B2 | 9/2004 | Bargheer et al. | |
| 6,793,016 B2 | 9/2004 | Aoki et al. | |
| 6,808,230 B2 | 10/2004 | Buss et al. | |
| 6,817,675 B2 | 11/2004 | Buss et al. | |
| 6,826,792 B2 | 12/2004 | Lin | |
| 6,848,742 B1 | 2/2005 | Aoki et al. | |
| 6,857,697 B2 | 2/2005 | Brennan et al. | |
| 6,869,139 B2 | 3/2005 | Brennan et al. | |
| 6,869,140 B2 | 3/2005 | White et al. | |
| 6,871,696 B2 | 3/2005 | Aoki et al. | |
| 6,892,807 B2 | 5/2005 | Fristedt et al. | |
| 6,893,086 B2 | 5/2005 | Bajic et al. | |
| 6,929,322 B2 | 8/2005 | Aoki et al. | |
| 6,957,545 B2 | 10/2005 | Aoki | |
| 6,976,734 B2 | 12/2005 | Stoewe | |
| 7,013,653 B2 | 3/2006 | Kamiya et al. | |
| 7,040,710 B2 | 5/2006 | White et al. | |
| 7,052,091 B2 | 5/2006 | Bajic et al. | |
| 7,070,232 B2 | 7/2006 | Minegishi et al. | |
| 7,083,227 B2 | 8/2006 | Brennan et al. | |
| 7,114,771 B2 | 10/2006 | Lofy et al. | |
| 7,131,689 B2 | 11/2006 | Brennan et al. | |
| 7,147,279 B2 | 12/2006 | Bevan et al. | |
| 7,168,758 B2 | 1/2007 | Bevan et al. | |
| 7,338,117 B2 | 3/2008 | Ibqal et al. | |
| 7,356,912 B2 | 4/2008 | Iqbal et al. | |
| 7,370,911 B2 | 5/2008 | Bajic et al. | |
| 7,827,805 B2 | 11/2010 | Comiskey | |
| 8,285,127 B2* | 10/2012 | Mulder | F24D 5/02 392/347 |
| 9,061,602 B2* | 6/2015 | Stoewe | B60N 2/002 |
| 2004/0195870 A1 | 10/2004 | Bohlender et al. | |
| 2005/0066505 A1 | 3/2005 | Iqbal et al. | |
| 2005/0067862 A1 | 3/2005 | Iqbal et al. | |
| 2005/0093347 A1 | 5/2005 | Bajic et al. | |
| 2005/0140189 A1 | 6/2005 | Bajic et al. | |
| 2005/0173950 A1 | 8/2005 | Bajic et al. | |
| 2005/0178755 A1* | 8/2005 | Ulbrich | B60H 1/00285 219/202 |
| 2005/0200179 A1 | 9/2005 | Bevan et al. | |
| 2006/0138810 A1 | 6/2006 | Knoll et al. | |
| 2006/0152044 A1 | 7/2006 | Bajic et al. | |
| 2006/0158011 A1 | 7/2006 | Marlovits et al. | |
| 2007/0001507 A1 | 1/2007 | Brennan et al. | |
| 2007/0176471 A1 | 8/2007 | Knoll | |
| 2009/0025770 A1* | 1/2009 | Lofy | H01L 35/32 136/201 |
| 2010/0193498 A1* | 8/2010 | Walsh | F24H 3/002 219/217 |
| 2010/0327636 A1 | 12/2010 | Stoll et al. | |
| 2013/0300159 A1* | 11/2013 | Berroth | B60N 2/5635 297/180.14 |
| 2015/0330672 A1* | 11/2015 | Cho | F25B 13/00 62/498 |

FOREIGN PATENT DOCUMENTS

| | | |
|---|---|---|
| EP | 0 280 213 | 8/1988 |
| EP | 1266794 | 12/2002 |
| EP | 1323573 | 7/2003 |
| WO | 96/05475 | 2/1996 |
| WO | 02/053410 | 7/2002 |
| WO | 2005/021320 | 3/2005 |

OTHER PUBLICATIONS

GMT 830 Heating & Ventilation System, IGB Automotive Ltd., received by Assignee W.E.T. Automotive Systems, Jun. 2003.
Specializing in Seat Ventilation and Heating Systems, Seat Comfort Systems, http://www.seatcomfort.comsemashow1.htm, Jun. 10, 2003.
Lexus LS430 Conditioned Seat, Pictures of prior products.
Cadillac XLR Conditioned Seat, Pictures or prior products.

* cited by examiner

HEATING DEVICE

CLAIM OF PRIORITY

The present application claims the benefit of the priority of the filing dates of German Applications DE 102011110679.4, filed on Aug. 19, 2011; DE 102011122129.1, filed on Dec. 23, 2011; and DE 102012009066.8, filed on May 9, 2012, the contents of which are hereby incorporated by reference in their entirety.

FIELD

One object of this invention is a ventilating device with at least one air guidance device, wherein the air guidance device has at least one channel segment.

SUMMARY

One embodiment of the present teachings includes a ventilating device with at least one air guidance device, wherein the air guidance device has at least one channel segment.

Another embodiment of the present teachings includes: a ventilating device with at least one air guidance device, wherein the air guidance device has at least one channel segment; at least a first channel segment that is swingable relative to at least one additional channel segment; a channel segment carries a temperature control bundle in order to control the temperature of air streaming through; a heat resistor and/or a heat conducting pipe as a temperature control bundle; or a combination thereof.

FIGURES

Details of the invention will be discussed in the following material. These discussions should make the invention intelligible. However, they are meant only as examples. It is obvious that, in the area of the invention defined by the claims, one or more characteristics that are described may be omitted, changed, or supplemented. It is also clear that the characteristics of venous embodiments may be combined with one another. If a characteristic can be fulfilled at least partially, this means that this characteristic is also completely fu filled or essentially completely fulfilled. It is decisive that the implementation of an achievement of the desired use allows it to have a recognizable extent, for example, a corresponding characteristic may be at least 50%, 90%, 95%, or 99% fulfilled. If a minimum amount is given, then naturally something larger than this minimum amount may be used. When something is described for an object, then this can be used for the predominant part or the totality of all other similar objects. Unless noted otherwise, the intervals include their boundary points.

In the following, reference is made to:
FIG. 1 A vehicle in a partial longitudinal section
FIG. 2 Top view of an electrical heating device
FIG. 3 Cross-section through the electrical heating device of FIG. 2
FIG. 4 One possible ventilating device

DESCRIPTION OF THE INVENTION

This invention relates to a vehicle 1. The concept "vehicle" means in particular a device for transporting persons and/or goods. Examples that are imaginable include land vehicles, water vehicles, tracked vehicles, and aircraft vehicles, in particular airplanes, ships, and automobiles.

In addition, the invention relates to a climate controlled area 2. The word "climate controlled area" includes in particular an object that may be affected by at least one climate parameter, meaning that it is subject to control or regulation, in particular one that may be at least for a short time kept at a specific desired value or brought to a desired area and/or kept there on an extended basis. This applies preferentially to such parts of its surface with which a medium can be intentionally brought into contact when using the object, or with which a user may at least potentially come into contact when using the object. "Controlled area" means in particular an object for which there is an underlying means of control or regulation for at least one size. The term "climate parameter" contains in particular at least one climatic measurement, for example, temperature, humidity, composition of the air, and/or speed of a liquid current. Application possibilities are climatized seats or steering wheels, seat coverings, office outfittings, cloth elements for passenger areas, storage containers, fuel hoses, or battery housings, motors, and other functional elements. It might also be foreseen that a climate controlled area 2 is a ventilated zone, in particular in a vehicle 1. For example, in vehicles with an open top, the head and shoulder area of a passenger can be supplied with an even stream of air of the desired temperature in order to balance out wind currents during travel.

Expeditiously, a climate controlled area 2 has at least one pad. "Pad" means in particular a device for dampening blows and/or distributing local pressure points onto a larger surface. As an example, blocks made of polyurethane foam are noted.

Preferentially, a climate controlled area 2 has at least one cover 4. The term "cover" refers in particular to a flat object that at least in part is arranged on the surface of an object. Examples that are imaginable include airtight or air permeable layers, which contain leather and/or a textile with or without holes and that are arranged on a pad, or skin coverings, that cover over at least a part of the surface of a foam-like material.

Another object of this invention is a climatizing device 5. The word "climatizing device" includes in particular an object that is suitable for having an effect on a climate parameter, especially for at least for a snort time to keep it at a specific desired value or brought to a desired area and/or kept there on an extended basis. This permits bringing to a correct temperature, ventilating, humidifying or dehumidifying, and/or adjusting the climate. In particular this is suited for bringing something to the correct temperature or adjusting the climate of a seat for long automobile trips or for preliminary adjustment of the temperature of fuel. It is also imaginable that one might heat the neck area of a passenger in an open vehicle through the outflow of warm air.

It is favorable if a climatizing device 5 has at least one ventilating device 6. "Ventilating device" means in particular a device that can be used for a targeted change of the composition of the air or air currents in particular on a surface or in a room area, such as an on-board climatizing unit, at least partially media with air permeable spacers, spacer fabrics, and/or climatizing inserts. This allows the ventilation of at least one climate controlled area 2, for example, the surface of an object, in particular for dehumidifying or bringing to a correct temperature surfaces for climate controlled areas 2 that are near people or that are touched by people.

It is advantageous if a ventilating device 6 has at least one air intake device 7. The label "air intake device" contains in particular a device for moving air. Imaginable examples are axial or radial ventilators.

It is expeditious for a ventilating device 6 to have at least one air guidance device 8. "Air guidance device" means in particular a device that can guide the air from an air guidance device to at least one air exchange device or that can guide the air in the opposite direction. In particular, this can be a flat, bendable, or creasable channel, which connects an air input opening in a seat with an air output opening, from which the air streams out of the seat onto the shoulder and neck area of a passenger. For example, the air can be warmed or cooled.

Figure 4:
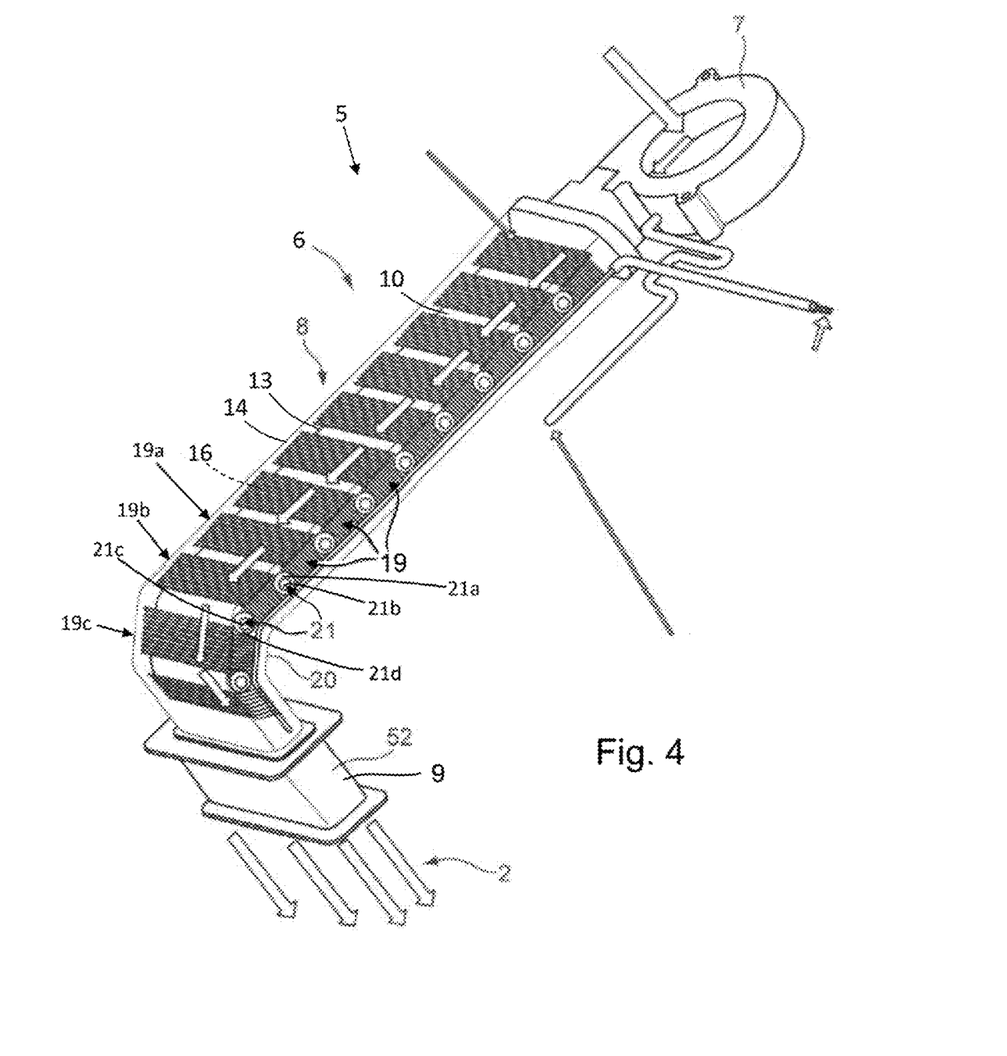

Preferentially, a ventilating device 6 has at least one air exchange device 9. The concept "air exchange device" refers in particular to a device for exchanging air between the air guidance device 8 and a zone to be ventilated of a mate controlled area an environment, a climate controlled area, and/or a user. Particularly suited for these are flat hollow bodies, at least in the form of spacer fabrics on a seat surface under a cover (FIG. 4). For blowing out to the neck area of the passenger, a blowout shaft 52 (FIG. 4) possibly supported by directing ribs is better suited.

Expeditiously, an air exchange device 9 has at least partially one position to which a climate controlled area can be effectively supplied. An example to be noted is an arrangement under the cover of a seat.

It makes sense that an air guidance device has at least one connection device, which purposely guides the air from at least one air intake device to at least one air exchange device or in the opposite direction. Preferentially, it has a position that allows transport with little loss and small use of construction room, for example, in at least one recess of a climate controlled area 2 or a pad 3, in particular in the form of fluid throughflow in the pad.

It is advantageous if an air guidance device 8 has at least one free area 11. "Free area" means in particular at least a partially open space that can absorb air and then move it through. This allows an intake of air into or an exhaust of air out of a zone where the temperature is to be brought to the correct temperature.

Preferentially a ventilating device 6 has at least one air distributing layer 12. The term "air distributing layer" contains in particular a flat component, which lies in a longitudinal direction along its surface and is air permeable, preferentially in at least 2 directions. This allows a surface distribution of air, which is fed from an air intake device 7 into an air guidance device 8, or the sucking up of air to a surface to be climatized in order to guide it to the air intake device 7 via the air guidance device 8. One could imagine, for example, spacer fabrics, dimpled foils, dimpled foam, open-cell foam, or the like.

Expeditiously a connecting device, air exchange device, and/or air guidance device has at least one separating device 13. "Separating device" means in particular a device that can restrict or prevent the compression of an air guiding free space 11.

Preferentially an air guidance device 8 has at least one enclosure device 14. The concept "enclosure device" refers in particular to a device that prevents the air guided into the air guidance device from leaking out of the air guidance device at an undesired location.

It is advisable that an enclosure device 14 have at least one partial enclosure 15. The word "partial enclosure" includes in particular, for example, an upper and lower limiting layer of an air distributing layer.

It is recommended that a partial enclosure 15 be at least partially out of the material that inhibits the throughflow of air, in particular in areas turned toward users. Especially suited for these are foils that are not air permeable, a metal plate, a dimpled plastic foil, a foam plate essentially not permeable by air, and stiff plastic profiles.

As the case may be, at least one partial enclosure 15 is at least partially made of a material that is air permeable, in particular in areas turned toward users. For example, one can imagine textiles, foils with holes, or foam pads with holes.

It is advantageous if a partial enclosure 15 has at least partially one position that works together with a larger partial enclosure to result locally in a closed enclosure device 14 running essentially along the stretch of a cross-section. This provides the efficient conduction of a stream of air through the air guidance device along a main stream direction and a simultaneous simple assembly. Preferentially a first and a second partial enclosure lie in a separating device between these enclosures and are connected with each other at least in parts of their edges.

It is good if an air guidance device 8 has at least one air flow channel 16. "Air flow channel" means in particular a long hollow space transporting air to the air exchange device and/or to the air intake device or to transport air away from these.

It is expeditious if an air flow channel 16 has at least partially a position that protects its free stream cross-section against compression by the weight of the users body and allows an efficient distribution of air with the least possible loss. As an example, one may name laying foam into a pad or maintaining a recess the foam of a pad.

Preferentially an air flow channel 16 has always partially an arrangement that results in a distribution along a surface from which air is to be removed or onto which air is to be blown. One can imagine for example at least a partial course along a B side of a pad turned toward a user or a front face lying sideways between the A and B side.

It is advantageous if an air flow channel 16 has at least one channel vein 17. The term "channel vein" contains in particular a preferentially longitudinal component or a partial section thereof, which has a permeable vein hollow space in the flow direction the air and a partition bordering at least partially the hollow space along the length of the air current.

It is advantageous if a channel vein 17 has at least partially a form that results in optimization of the current. Circular or square cross-sections are particularly well-suited. For example, outer diameters or corner lengths of 10 to 12 mm, are involved.

As necessary, a channel vein 17 is partially out of a material that is at least partially a textile. As an example, textile products and woven material are noted, which already at the time of manufacture can be stretched in more than 2 dimensions.

It is expeditious that a channel vein have at least one vein hollow space 18. It is advantageous that a vein hollow space 18 have at least partially a circular or square cross-section and, for example, a clear width of 8 to 10 mm.

Preferentially an air guidance device 8 has at least one channel segment 19. "Channel segment" means in particular a component that can be set off or a section of a component that can be set off that is relatively movable in the current direction before or behind other components or sections of components that exist, in particular that they are movable, capable, swivelable, and/or bendable along the length and/or along the width. A component is preferentially stiff or less elastic.

It is expeditious for 2 channel segments 19 to be provided next to one another and set up behind one another in the direction of the current in order to support a longitudinal air flow channel 16.

It can be useful to provide such a channel segment 19 in an amount that brings with it a broadened, securely supported current cross-section. The example is noted of several channel segments or segment frames next to one another on the level of the cross section. This achieves an increased pressure stability through a larger number of cleats 40 in a cross-section guiding the air.

Preferentially a channel segment 19 has a position that results in a minimization of air loss to the outside, for example, in the form of pipe sections that are arranged behind one another and surrounded by an enclosure device 14, or that support from the outside an enclosure device stretching along the length (not illustrated).

It is advisable that a channel segment 19 have at least one segment frame 20. "Segment frame" refers in particular to a component that has 2 sides of a hollow space cross-section supporting each other (cross-section to the direction of the current). A cross-section of a round or right angle pipe section is especially suitable.

A material that is stable under pressure and stiff is recommended for this. For example, plastics come under consideration, in particular polymers that are strengthened by fibers.

It is advantageous at a channel segment 19 have at least one segment joint 21. The label "segment joint" means in particular a device that allows swinging or creasing of a channel segment 19 relative to a channel section found either in front of or behind the channel segment 19. This allows the realization of channels that are stable under pressure, more bendable, or more arched. An example noted of this are dimples 42 or recesses 43, which are provided as turning points on the channel segment 19 at their central axis, and take hold of corresponding dimples or recesses of another component. For example, one can imagine hinge frame conveyors or flat objects (e.g., an enclosure device) onto which channel segments are fastened and which connect a segment frame along at least one of its outer edges with another component.

Advantageously, a climatization device 5 has at least one temperature control device 22. "Temperature control device" means in particular a device that can be used for a targeted change of the temperature in its environment. Especially suitable for such are heating devices, cooling devices, a Peltier element, a heat conducting pipe, and/or an air moving device, such as a ventilator. It can be especially favorable if the temperature control device 22 is set up for a production unit with direct current and/or a production unit with low voltage, especially for 12 V or 24 V. For example, one can imagine laid-in modules, which are integrated in the padding of an object intended for interior use, such as a seat.

Preferentially, a temperature control device has at least one conductor bundle. The word "conductor bundle" means in particular an electrical conducting bundle of lines. "Bundle" means in particular an object whose extent in one direction is much greater in space than in the other 2 dimensions (e.g., 10 times greater). Preferentially the bundle is elastic in bending, strong, and has similar dimensions in both cross-section dimensions. It can be a monofilament or a multifilament.

It is advisable that a temperature control device 22 have at least one heating device 25. The label "heating device" refers in particular to a device that for the purpose of warming of the environment prepares thermal energy and radiates through conduction, convection, and/or through heat radiation to its environment. This allows a fast working or long lived heating of a user or the heating of an object to be heated, in particular the inner space of a housing. Examples are named as contrivances with at least an electric heat resistor, a flexible textile flat heating element, a heat pump, a Peltier element, a radiator, a conductor, and/or a heating spiral.

It makes sense for a heating device 25 to have at least partially a position that brings with it low thermal insulation against a zone where the temperature is to be controlled. This allows low energy use and rapid effect of the heating. It is imaginable for example to have positions directly on the underside of a cover, preferentially without intermediate padding or shim layers, under a covering layer and under a casing on an interior side of a partition housing, such as in channels or in inlays that are laid into a padded material.

It is good that a heating device 25 has at least one heat resistor carrier 26. "Heat resistor carrier" means in particular a device for mechanical unloading of a heat resistor and/or for fixing its spatial location. Especially suitable are flexible flat objects, preferentially at least partially made of a textile, fabric, mesh, woven material, fleece, bendable thermoplasts, stamped or dimpled foil, air permeable material, the controlled area itself, a portion of its surface or stiffened components, profiles, hollow bodies, or segment frames 20 of an air guidance channel.

Preferentially a heat resistor carrier 25 has at least partially a width of 1 to 20 cm, in particular 2 to 16 cm, especially 2 to 5 cm, and a length of up to 100 cm, in particular 2 to 15 cm, especially 3 to 6 cm.

It is expeditious that a heat resistor carrier 26 at least be partially out of material that is good for molding, is not expensive, and/or is capable of thermal conduction. For example, one can imagine polymers, in particular polyamides, polyesters, polyurethanes, and polycarbonates.

Preferentially a heating device 25 has a least one heat resistor 27. The concept "heat resistor" means in particular a electrical resistor, which during the flow-through of the current serves to give off thermal energy directly or indirectly from warming a climate controlled area 2. For example, one or several vein conductors can be considered with at least partially insulated individual bundles opposite one another, e.g., lacquer insulated strands with a copper and/or steel part.

Expeditiously a heating device 25 has at least one temperature control bundle 28. The word "temperature control bundle" includes in particular a strand-like component for inserting or removing heat along the bundle, e.g., a heat resistor 27 or a heat conducting pipe (alternative not illustrated).

It makes sense for a temperature control bundle 28 to have at least partially a diameter of 0.05 to 10 mm, in particular 0.1 to 4 mm, in particular 1 to 2 mm.

Advantageously a temperature control bundle 28 has at least partially a position that results in efficient temperature control of the air that streams past. As an example, surfaces are noted along a flat area to be heated, windings around an air conduction channel or lines across the direction of the flow of a fluid channel in the medium that is flowing past. It is particularly favorable to guide the temperature control bundle into or around individual channel segments, in particular to have them laid into recesses of the channel. A preferred embodiment results if a heating bundle 28 winds around a channel segments and thereby interruptions are laid into the segment frames. In this way the parts of the temperature control bundle that rise up in the current are rinsed by the fluid and heat it. It can be advisable for several sections of the temperature control bundle to be laid down on different levels of the fluid channel in order to evenly heat the laminar flows.

Preferentially a temperature controlled bundle 28 has at least one coil 29. "Coil" means in particular a conductor loop that encircles at least in sections an air flow channel, in particular at least 360 degrees.

It is expeditious that a coil 29 have at least one position that results in a firm anchoring and the avoidance of short circuits. Coils are especially suitable that are laid in a depression between at least 2 supporting faces 31.

Preferentially, a coil 29 has a least partially an arrangement that results in rapid warming of the air. For example, it is imaginable to have heat bundles 28 arranged concentrically to an air flow channel to and/or at least partially perpendicular to a fluid flow.

In many cases it may be useful to provide such a coil 29 in such numbers that a high amount of heat results in a smell space. For example, there come into consideration 2 to 200 coils, in particular 4 to 30, in particular 5 to 15 coils per channel segment or for every 10 cm of channel length. This allows a compact building form and a swift heating of fluids.

It is advisable that a temperature control device 22 have at least one fixing recess 30. "Fixing recess" refers in particular to a recess, for example in a channel or a channel segment, around at least one functional element, such as a conductor, in particular a heat resistor, that at least in sections provides support and/or fixes or stabilizes in at least one movement direction against a displacement from its position. As an example, circular boreholes are noted that are used for threading through a bundle shaped electrical conductor or heat resistor, longitudinal depressions for sinking a heat resistor, or longitudinal breaks, which allow tensioning a heat bundle in a cross-section across the cross-section of the current of the channel. This provides a safe position for a functional element and simultaneously provides for efficient heating of air.

It may be necessary to provide such a fixing recess 30 in numbers to have the effect of a placement of functional elements, such as heat conducting sections, of various heights relative to the midpoint 46 or the surface focus of the current blend. For example, it is imaginable to have 2 or 3 types of fixing recesses 30', 30" of deeply cut or collapsed types.

Figure 1:
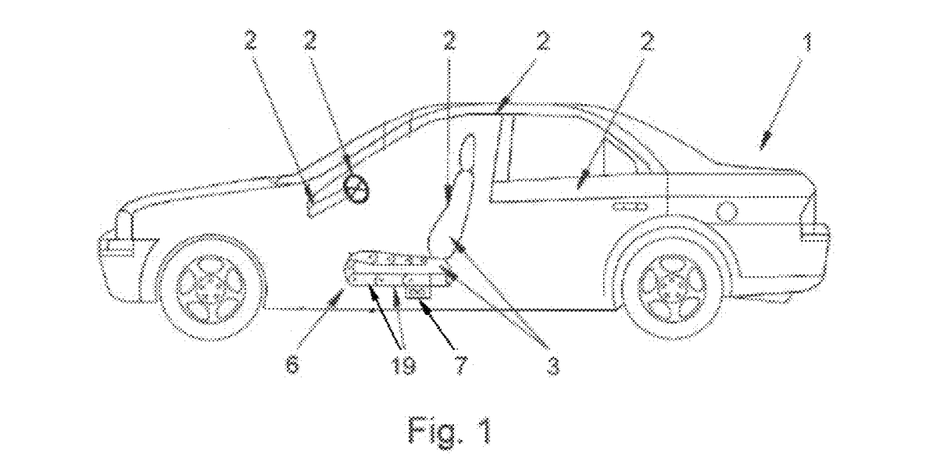
Figure 2:
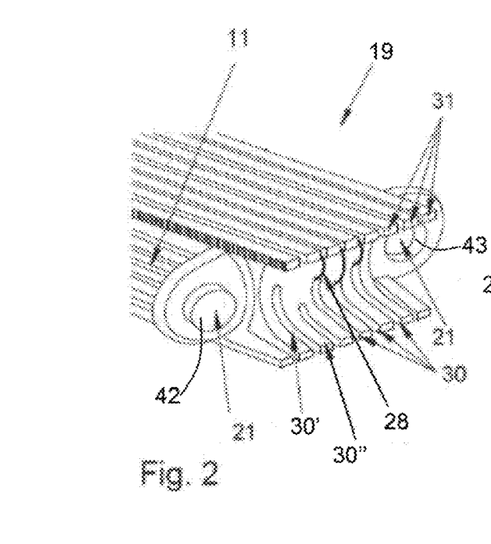
Figure 3:
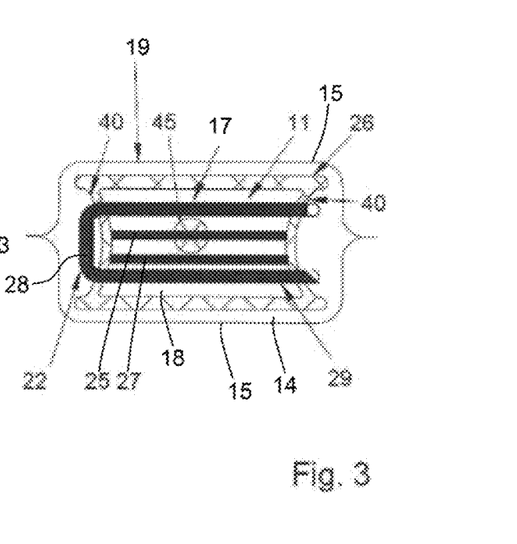

It is preferential that a fixation recess 30 at least partially has a form that allows the simple manufacture of a heat resistor carrier. One or more longitudinal channel type depressions are especially suitable, which at least partially are arranged consecutively around a heat resistor carrier 26, preferentially at least partially parallel at equal distances from each other. As needed, it is preferred if several fixation recesses 30 surround the heat resistor carrier 26 with closed ring-shaped channels in order to be able to use a simple two-part mold for manufacture. It can be foreseen that several fixation recesses 30 are connected with each other with at least a cross connection. For example, slits or recesses are imaginable in a supporting projecting element 31, if they are permeable crosswise to the supporting projecting elements 31 or lengthwise to the longitudinal axis of the heat resistor carrier 26 (FIG. 2).

It makes sense for a fixation recess to have at least partially a form that results in a simple manufacturing process for coils. For example, one or several longitudinal fixation recesses are considered, which are arranged consecutively and at least partially surround a heat resistor carrier. It can be especially useful if a fixation recess winds in snail-like fashion around a heat resistance carrier with a partial section in order to be able to continuously receive the conductor bundle wrapped around a heat conductor (not illustrated).

It is useful for a temperature control device 22 to have at least one supporting projecting element 31. The word "supporting projecting element" includes in particular a projecting element for support and/or fixation of another component, in particular a coil. An example named is that of cleats that stand out parallel to a conductor run out of the surface of the object provided with the conductor in order to support a conductor bundle from the side.

It is advantageous for a supporting projecting element 31 to have at least partially a form that has the effect of a simple ability to manufacture a heat resistor carrier 26. For example, one can imagine one or several lengthwise projecting elements, which are arranged at least partially on an air conducting channel 16, preferentially at least partially parallel to each other and with equal distances between them. A preferred embodiment results if several supporting projecting elements 31 surround the air conductor channel 16 in enclosed, ring-shaped busters in order to be able to use a simple two-part mold for manufacture (FIG. 2).

Expeditiously, a supporting projecting element has at least partially a form that results in simple ways to manufacture coils. One or several longitudinal projecting elements are particularly suited, which are arranged consecutively at least partially in screw form around an air conductor channel. It may be advisable that a supporting projecting element winds around an air conductor channel at least over a partial section in snail-like form, in order to be able to wind the conductor bundle continuously around the heat conductor (not illustrated).

REFERENCE NUMBER LIST

1 Vehicle
2 Climate controlled area
3 Pad
4 Cover
5 Climatization device
6 Ventilating device
7 Air intake device
8 Air guidance device
9 Air exchange device
11 Free space
12 Air distributing layer
13 Spacer device
14 Enclosure device
15 Partial enclosure
16 Air flow channel
17 Channel vein
18 Vein hollow space
19 Channel segment
19a first channel segment
19b second channel segment
19c third channel segment
20 Segment frame
21 Segment joint
21a first segment joint
21b second segment joint
21c third segment joint
21d fourth segment joint
22 Temperature control device
25 Heating device
26 Heat resistor carrier
27 Heat resistor 28 Temperature control bundle
29 Coil
30, 30', 30" Fixation recess
31 Supporting projecting element
40 Cleat
42 Dimple
43 Recess
45 Midpoint

The invention claimed is:

1. A ventilating device comprising:
at least one air guidance device, and
at least one temperature control bundle including a heat resistor and/or a heat conducting pipe,
wherein the at least one air guidance device has a first channel segment that is swingable relative to a second channel segment,
wherein the first channel segment, the second channel segment, or both carry the at least one temperature control bundle to warm a temperature of air streaming through the at least one air guidance device,
wherein the at least one temperature control bundle is laid in fixing recesses that are depressions that are arranged consecutively around an outside of the first channel segment, the second channel segment, or both, and
wherein the fixing recesses are arranged at various heights relative to a midpoint of the first channel segment, the second channel segment, or both so that the at least one temperature control bundle is positioned across an inside of the first channel segment, the second channel segment, or both at different heights relative to the midpoint of the first channel segment, the second channel segment, or both.

2. A seat including the ventilating device according to claim 1.

3. The seat according to claim 2, wherein the ventilating device serves for ventilating a surface of the seat, for balancing air currents in at least a partially open auto body, for temperature control of a neck area of a passenger, or a combination thereof.

4. A vehicle including at least one ventilating device according to claim 1.

5. A ventilating device comprising:
a. at least one air guidance device including:
i. a first channel segment having a first segment joint;
ii. a second channel segment having a second segment joint and a third segment joint,
iii. a third channel segment having a fourth segment joint,
iv. at least one temperature control device,
b. at least one air intake device in communication with an end of the at least one air guidance device; and
c. at least one air exchange device in communication with an opposing end of the at least one air guidance device,
wherein the first segment joint is connected to the second segment joint, and the third segment joint is connected to the fourth segment joint so that the first channel segment, the second channel segment, and the third channel segment are swingable relative to one another,
wherein each of the first channel segment, the second channel segment, and the third channel segment comprises a plurality of fixing recesses,
wherein the fixing recesses are depressions that are arranged consecutively around an outside of the first channel segment, the second channel segment and the third channel segment, the depressions support the at least one temperature control device,
wherein the depressions are arranged at various heights relative to a midpoint of the respective first channel segment, the second channel segment and the third channel segment so that the at least one temperature control device is positioned inside and across the first channel segment, the second channel segment, and the third channel segment at different heights relative to the midpoint of each of the first channel segment, the second channel segment, and the third channel segment,
wherein the at least one air intake device moves air through the at least one air guidance device so that the air streams past the at least one temperature control device that is positioned at various heights across the first channel segment, the second channel segment, and the third channel segment thereby heating the air and supplying warm air to a shoulder or neck area of a passenger.

6. The ventilating device of claim 5, wherein the at least one air guidance device has at least one connection device that guides the air from the at least one air intake device to the at least one air exchange device, or in an opposite direction.

7. The ventilating device of claim 6, wherein the at least one connection device, the at least one air exchange device, the at least one air guidance device, or a combination thereof have at least one separating device.

8. The ventilating device of claim 7, wherein the at least one separating device restricts and/or prevents compression of at least one free area.

9. The ventilating device of claim 5, wherein the at least one air guidance device has at least one free area located within the at least one first channel segment, the at least one second channel segment, or both.

10. The ventilating device of claim 5, wherein the ventilating device includes at least one air distributing layer.

11. The ventilating device of claim 5, wherein the at least one air guidance device includes at least one enclosure device.

12. The ventilating device of claim 5, wherein the first segment joint includes dimples and/or recesses, the second segment joint includes dimples and/or recesses, the third segment joint includes dimples and/or recesses, and the fourth segment joint includes dimples and/or recesses.

13. The ventilating device of claim 12, wherein the dimples and/or the recesses are turning points on a central axis of the first channel segment, the second channel segment, the third channel segment, and/or the fourth channel segment.

14. The ventilating device of claim 5, wherein the at least one temperature control device includes at least one conductor bundle.

15. A ventilating device comprising:
a. a guidance device defining an elongated air flow channel, the air guidance device comprising:
i. at least one first channel segment having at least one segment joint including a dimple, the at least one first channel segment including a plurality of depressions that are arranged consecutively around an outside of the at least one first channel segment;
ii. at least one second channel segment having at least one segment joint defining a recess, the at least one second channel segment including a plurality of depressions that are arranged consecutively around an outside of the at least one second channel segment, b. at least one heating coil laid in the depressions arranged consecutively around the at least one first channel segment and the at least one second channel segment and encircling the air flow channel, the at least one heating coil is arranged at various levels inside the at least one first channel segment and inside the at least one second channel segment, c. an air intake device in communication with an end of the air guidance device, the air intake device supplies air through the air guidance device so that the air streams past and contacts the at least one heating coil so that the air is heated;

d. an air exchange device in communication with an opposing end of the air guidance device, e. an enclosure device surrounding the at least one first channel segment and the at least one second channel segment so that the air is prevented from leaking out of the air guidance device between the end of the air guidance device and the opposing end of the air guidance device, wherein the dimple is rotatably received into the recess so that the at least one first channel segment is moveable relative to the at least one second channel segment, or vice versa, wherein the air intake device is an axial ventilator or a radial ventilator, wherein the ventilating device is in a vehicle seat, and wherein the air exchange device is configured to be directed toward a shoulder or neck area of a passenger in the vehicle seat.

* * * * *